（12） United States Patent
Tang

(10) Patent No.: US 8,633,772 B2
(45) Date of Patent: Jan. 21, 2014

(54) POWER CONVERSION CIRCUIT AND ELECTRONIC DEVICE WITH POWER CONVERSION CIRCUIT

(71) Applicant: Xing-Hua Tang, Shenzhen (CN)

(72) Inventor: Xing-Hua Tang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/626,906

(22) Filed: Sep. 26, 2012

(65) Prior Publication Data

US 2013/0257532 A1    Oct. 3, 2013

(30) Foreign Application Priority Data

Apr. 3, 2012    (CN) .......................... 2012 1 0095715

(51) Int. Cl.
*H03F 3/04*    (2006.01)
(52) U.S. Cl.
USPC .......................................... 330/297; 330/296

(58) Field of Classification Search
USPC .................... 330/297, 296, 285, 10
See application file for complete search history.

(56) References Cited

U.S. PATENT DOCUMENTS

| 5,612,646 | A | * | 3/1997 | Berning | 330/10 |
| 7,839,215 | B2 | * | 11/2010 | Mendenhall | 330/251 |
| 8,253,491 | B2 | * | 8/2012 | Mendenhall | 330/251 |

\* cited by examiner

*Primary Examiner* — Henry Choe
(74) *Attorney, Agent, or Firm* — Altis Law Group, Inc.

(57) ABSTRACT

A power conversion circuit includes a pulse width modulator, a feedback module, a negative voltage producing module, a voltage regulating module, a path switch, and a rectifier module. The path switch is connected to a power port connected to a power source. The feedback module produces a feedback signal according to the voltage of a positive voltage input port of a power amplifier. The pulse width modulator receives the feedback signal, and outputs a pulse signal with a corresponding duty cycle according to the feedback signal to the path switch, then producing a switching power supply signal; the rectifier module converts the switching power supply signal to a direct current signal with a suitable positive voltage. The negative voltage producing module produces corresponding negative voltage when the path switch is turned on or off. The voltage regulating module regulates the negative voltage to a suitable negative voltage.

18 Claims, 2 Drawing Sheets

POWER CONVERSION CIRCUIT AND ELECTRONIC DEVICE WITH POWER CONVERSION CIRCUIT

BACKGROUND

1. Technical Field

The present disclosure relates to circuits and, particularly, to a power conversion circuit, and an electronic device with the power conversion circuit.

2. Description of Related Art

Nowadays, electronic device, such as mobile phone, tablet computer, media player, usually has an audio play back function. Therefore, a power amplifier is a necessary component in the electronic device with the audio play back function. Usually, there is need to provide positive voltage and negative voltage to power the power amplifier at the same time by using a power conversion circuit. However, the common power conversion circuit is complex and expensive.

A power conversion circuit and an electronic device with the power conversion circuit, to overcome the described limitations is thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described with reference to the accompanying drawings.

Figure 1:
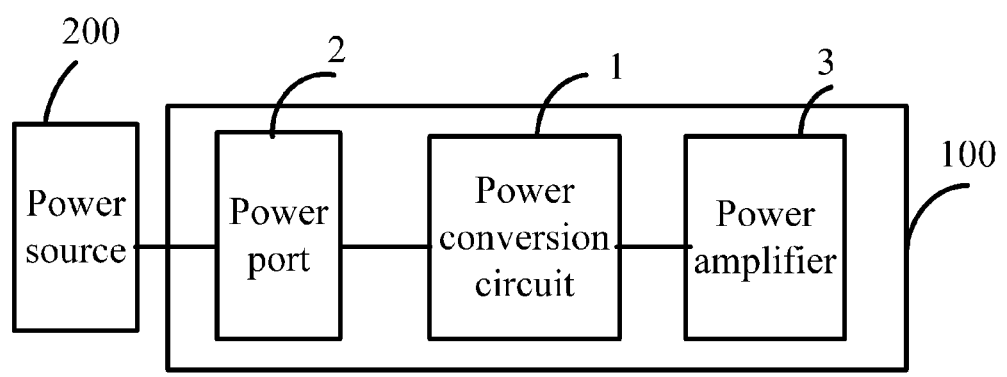
FIG. 1 is a block diagram of an electronic device with a power supply circuit, in accordance with an exemplary embodiment.
Figure 2:
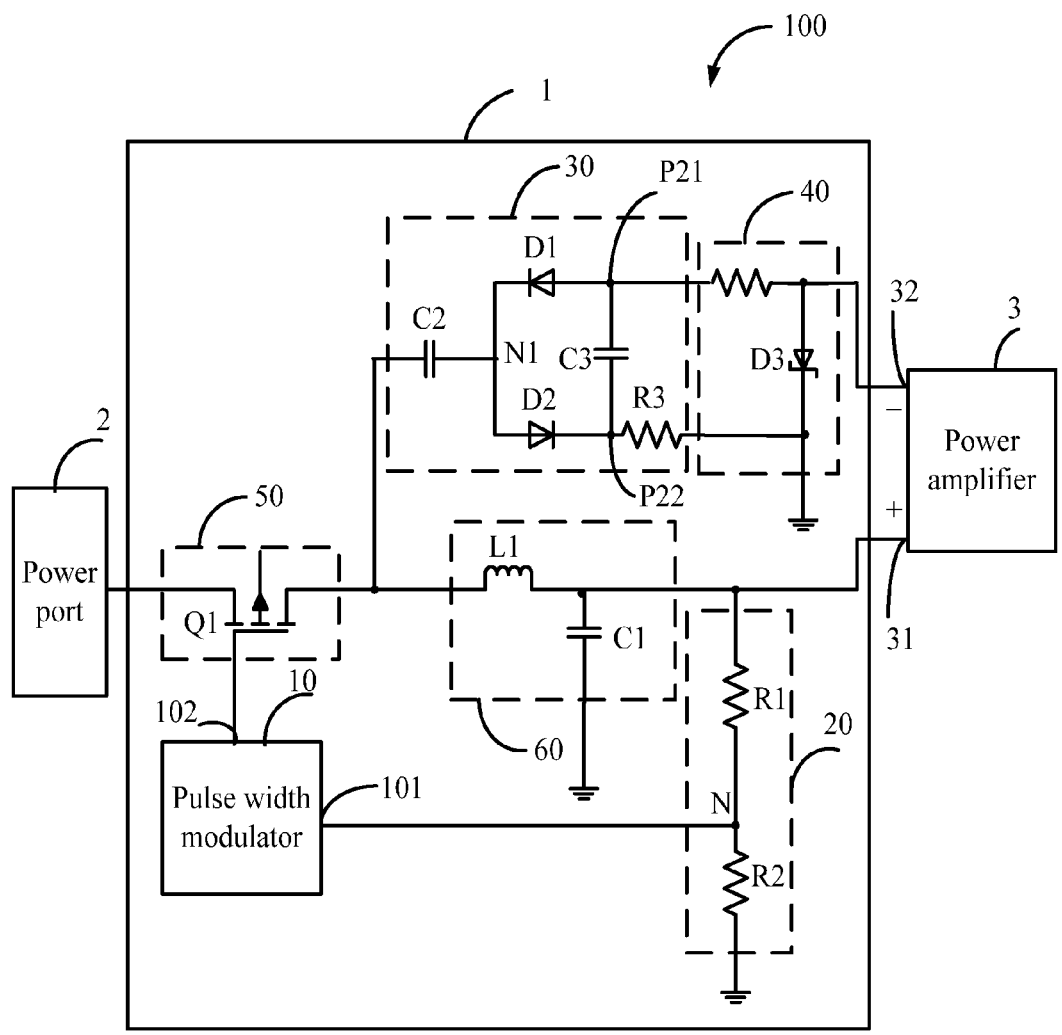
FIG. 2 is a circuit diagram of a power supply device of the electronic device of FIG. 1, in accordance with an exemplary embodiment.

Referring to FIGS. 1 and 2 together, an electronic device 100 of the embodiment is shown. The electronic device 100 includes a power conversion circuit 1, a power port 2, and a power amplifier 3. The power port 2 is used to connect to a power source 200, for example a power adapter, a battery, for example. The power amplifier 3 is used to amplify audio signals. The power amplifier 3 includes a positive voltage input port 31 and a negative voltage input port 32.

The power conversion circuit 1 is connected between the power port 2 and the power amplifier 3. The power conversion circuit 1 includes a pulse width modulator 10, a feedback module 20, a negative voltage producing module 30, a voltage regulating module 40, a path switch 50, and a rectifier module 60.

The path switch 50 is electrically connected between the power port 2 and the power amplifier 3. The feedback module 20 is connected to the positive voltage input port 31 of the power amplifier 3, and is used to obtain the voltage of the positive voltage input port 31 and produce a feedback signal reflecting the voltage of the positive voltage input port 31.

The pulse width modulator 10 is connected to the path switch 50 and the feedback module 20. The pulse width modulator 10 is used to output a pulse signal with a certain duty cycle to the path switch 50 and receive the feedback signal from the feedback module 20. The pulse width modulator 10 is also used to adjust the duty cycle of the pulse signal to a suitable duty cycle according to the feedback signal received from the feedback module 20, and then output the pulse signal with the suitable duty cycle. Therefore, the path switch 50 is turned on and off alternately according to the pulse signal, and converts a voltage of the power supply connected by the power port 2 to a switching power supply signal.

The rectifier module 60 is connected between the path switch 50 and the positive voltage input port 31 of the power amplifier 3, and is used to convert the switching power supply signal to a direct current signal with a suitable positive voltage and provide the suitable positive voltage to the positive voltage input port 31.

The negative voltage producing module 30 and the voltage regulating module 40 is electrically connected between the path switch 50 and the negative voltage input port 32 of the power amplifier 3 in series. The negative voltage producing module 30 produces a first negative voltage when the path switch 50 is turned on, and produces a second negative voltage when the path switch 50 is turned off.

The voltage regulating module 40 is used to regulate the first negative voltage and the second negative voltage to a suitable negative voltage and provide the suitable negative voltage to the negative voltage input port 32 of the power amplifier 3.

Therefore, the power conversion circuit 1 converts the voltage of the power supply connected to the power port 2 to a positive voltage and the negative voltage to power the power amplifier 3.

In detail, as shown in FIG. 2, the path switch 50 is an n-channel metal-oxide-semiconductor field-effect transistor (NMOSFET) Q1. The pulse width modulator 10 includes a feedback port 101 and a control port 102. The feedback port 101 is connected to the feedback module 20, and the control port 102 of the pulse width modulator 10 is connected to a gate of the NMOSFET Q1. A source of the NMOSFET Q1 is connected to the power port 2. In another embodiment, the path switch 50 can be a negative-positive-negative bipolar junction transistor (NPN BJT). In further embodiments, the path switch 50 can be a P-channel metal-oxide-semiconductor field-effect transistor (PMOSFET) or a positive-negative-positive bipolar junction transistor (PNP BJT).

The pulse width modulator 10 receives the feedback signal from the feedback module 20 via the feedback port 101, and outputs the pulse signal with a corresponding duty cycle to the gate of the NMOSFET Q1, then the NMOSFET Q1 is turned on or off alternately. Then the switching power supply signal is produced due to the NMOSFET Q1 is turned on or off alternately.

The feedback module 20 includes a first resistor R1 and a second resistor R2 which are connected between the positive voltage input terminal 31 and ground. A connection node A of the first resistor R1 and the second resistor R2 is connected to the feedback port 101. In the embodiment, the feedback signal is a voltage of the connection node A. Obviously, to those familiar with the art, a voltage of the connection node A is proportional to the voltage of the positive voltage input terminal 31. Assume the voltage of the positive voltage input terminal 31 is Vcc, then the voltage of the connection node A is Vcc*R2/(R1+R2).

In detail, the pulse width modulator 10 receives the feedback signal, and determines the voltage of the positive voltage input terminal 31 according to the feedback signal, and compares the voltage of the positive voltage input terminal 31 with a predetermined positive voltage. Therein, the predetermined positive voltage is the suitable positive voltage provided for the positive voltage input terminal 31. The pulse width modulator 10 enhances the duty cycle of the pulse signal output to the gate of the NMOSFET Q1 when determining the voltage of the positive voltage input terminal 31 is less than the predetermined positive voltage. The pulse width modulator 10 decreases the duty cycle of the pulse signal output to the gate of the NMOSFET Q1 when determining the voltage of the positive voltage input terminal 31 is greater than the predetermined positive voltage.

The rectifier module 60 includes an inductor L1 and a capacitor C1 which are connected between a drain of the NMOSFET Q1. A connection node of the inductor L1 and the capacitor C1 is connected to the positive voltage input port 31 of the power amplifier 3. The rectifier module 60 converts the switching power supply signal to a direct current signal with the suitable voltage.

The negative voltage producing module 30 includes capacitors C2, C3, a first diode D1, and a second diode D2. The first diode D1, the second diode D2, and the capacitor C3 are connected in series and constitute a loop circuit. Therein, a cathode of the first diode D1 is connected to an anode of the second diode D2. A first terminal P21 of the capacitor C3 is connected to the anode of the first diode D1 and constitutes an output port of the negative voltage producing module 30, a second terminal P22 of the capacitor C3 is connected to the cathode of the second diode D2 and is also connected to ground via a resistor R3.

The capacitor C2 is connected between the drain of the NMOSFET Q1 and a connection node N1 of the cathode of the first diode D1 and the anode of the second diode D2.

The voltage regulating module 40 includes a zener diode D3. A cathode of the zener diode D3 is grounded, and an anode of the zener diode D3 is connected to the output port OP of the negative voltage producing module 30 and the negative voltage input port 32 of the power amplifier 3.

When the path switch 50, namely the NMOSFET Q1 is turned on, the capacitor C2 is charged via the turned on path switch 50, and the capacitor C3 is charged via the second diode D2. Therefore, the voltage of the second terminal P22 is higher than the voltage of the first terminal P21 of the capacitor C2. Because the second terminal P22 is grounded via the resistor R3, the voltage of the second terminal P22 is nearly zero, and the voltage of the first terminal P21 is a negative voltage accordingly. Then the negative voltage producing module 30 outputs the first negative voltage, the zener diode D3 regulates the first negative voltage to a predetermined negative voltage and provides the predetermined negative voltage to the negative voltage input port 32 of the power amplifier 3.

When the path switch 50, namely the NMOSFET Q1 is turned off, the capacitor C2 is discharged via the resistor R3, and the voltage of the terminal of the capacitor C2 connected to the drain of the NMOSFET Q1 is decreased to zero. The voltage of the other terminal of the capacitor C2 connected to the connection node N1 is lower than the terminal connected to the drain of the NMOSFET Q1 when the NMOSFET Q1 is turned on, and the situation would maintain for a period of time after the NMOSFET Q1 is turned off. Therefore, the voltage of the other terminal of the capacitor C2 connected to the connection node N1 is a negative voltage, the voltage of the first terminal P21 of the capacitor C3 is pulled down to a second negative voltage lower than the first negative voltage via the first diode D1.

The zener diode D3 regulates the second negative voltage to the predetermined negative voltage and provides the predetermined negative voltage to the negative voltage input port 32 of the power amplifier 3.

Therefore, the present disclosure can provide the suitable positive voltage and the suitable negative voltage to power the power amplifier 3 via the power conversion circuit 1.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A power conversion circuit for converting a voltage of a power source to a positive voltage and a negative voltage to power a power amplifier, the power conversion circuit comprising:
   a path switch, electrically connected between a power port and the power amplifier, the power port connected to the power source;
   a feedback module, connected to a positive voltage input port of the power amplifier, configured to obtain the voltage of the positive voltage input port and produce a feedback signal reflecting the voltage of the positive voltage input port of the power amplifier;
   a pulse width modulator, connected to the path switch and the feedback module, configured to receive the feedback signal from the feedback module, and produce a pulse signal with a corresponding duty cycle according to the received feedback signal, and output the pulse signal to the path switch to cause the path switch to turn on or off alternately, then convert the voltage of the power source to a switching power supply signal;
   a rectifier module, connected between the path switch and the positive voltage input port of the power amplifier, configured to convert the switching power supply signal to a direct current signal with a suitable positive voltage and provide the suitable positive voltage to the positive voltage input port of the power amplifier;
   a negative voltage producing module, electrically connected between the path switch and a negative voltage input port of the power amplifier, configured to produce a first negative voltage when the path switch is turned on, and produce a second negative voltage when the path switch is turned off; and
   a voltage regulating module; connected between the negative voltage producing module and the negative voltage input port of the power amplifier, configured to regulate the first negative voltage and the second negative voltage to a suitable negative voltage and provide the suitable negative voltage to the negative voltage input port of the power amplifier.

2. The power conversion circuit according to claim 1, wherein the path switch is an n-channel metal-oxide-semiconductor field-effect transistor (NMOSFET), a source of the NMOSFET is connected to the power port, and a gate of the NMOSFET is connected to the pulse width modulator.

3. The power conversion circuit according to claim 2, wherein the pulse width modulator comprises a feedback port and a control port, the feedback port is connected to the feedback module, and the control port is connected to the gate of the NMOSFET.

4. The power conversion circuit according to claim 3, wherein the feedback module comprises a first resistor and a second resistor which are connected between the positive voltage input terminal of the power amplifier and ground; a first connection node of the first resistor and the second resistor is connected to the feedback port of the pulse width modulator.

5. The power conversion circuit according to claim 4, wherein the feedback signal is a voltage of the first connection node which is proportional to the voltage of the positive voltage input terminal.

6. The power conversion circuit according to claim 1, wherein the pulse width modulator is further configured to determine the voltage of the positive voltage input terminal according to the feedback signal, and compare the voltage of the positive voltage input terminal with a predetermined positive voltage; the pulse width modulator is further configured to enhance the duty cycle of the pulse signal output to the path switch when determining the voltage of the positive voltage input terminal is less than the predetermined positive voltage, and decrease the duty cycle of the pulse signal output to the path switch when determining the voltage of the positive voltage input terminal is greater than the predetermined positive voltage.

7. The power conversion circuit according to claim 1, wherein the rectifier module comprises an inductor and a first capacitor which are connected between the path switch and ground, a second connection node of the inductor and the first capacitor is connected to the positive voltage input port of the power amplifier.

8. The power conversion circuit according to claim 1, wherein the rectifier module negative voltage producing module comprises a second capacitor, a third capacitor, a first diode, and a second diode, the first diode, the second diode, and the third capacitor are connected in series and constitute a loop circuit; a cathode of the first diode is connected to an anode of the second diode, a first terminal of the third capacitor is connected to the anode of the first diode and constitutes an output port of the negative voltage producing module, a second terminal of the third capacitor is connected to the cathode of the second diode and is also connected to ground via a third resistor; the second capacitor is connected between the path and a third connection node of the cathode of the first diode and the anode of the second diode.

9. The power conversion circuit according to claim 8, wherein the voltage regulating module comprises a zener diode, a cathode of the zener diode is grounded, and an anode of the zener diode is connected to the output port of the negative voltage producing module and the negative voltage input port of the power amplifier.

10. An electronic device comprising:
a power port, configured to connect to a power source;
a power amplifier comprising a positive voltage input port and a negative voltage input port; and
a power conversion circuit comprising:
a path switch, electrically connected between a power port connecting to the power source and the power amplifier;
a feedback module, connected to a positive voltage input port of the power amplifier, configured to obtain the voltage of the positive voltage input port and produce a feedback signal reflecting the voltage of the positive voltage input port of the power amplifier;
a pulse width modulator, connected to the path switch and the feedback module, configured to receive the feedback signal from the feedback module, and produce a pulse signal with a corresponding duty cycle according to the received feedback signal, and output the pulse signal to the path switch to cause the path switch to turn on or off alternately, then converting the voltage of the power source to a switching power supply signal;
a rectifier module, connected between the path switch and the positive voltage input port of the power amplifier, configured to convert the switching power supply signal to a direct current signal with a suitable positive voltage and provide the suitable positive voltage to the positive voltage input port of the power amplifier;
a negative voltage producing module, electrically connected between the path switch and a negative voltage input port of the power amplifier, configured to produce a first negative voltage when the path switch is turned on, and produce a second negative voltage when the path switch is turned off; and
a voltage regulating module; connected between the negative voltage producing module and the negative voltage input port of the power amplifier, configured to regulate the first negative voltage and the second negative voltage to a suitable negative voltage and provide the suitable negative voltage to the negative voltage input port of the power amplifier.

11. The electronic device according to claim 10, wherein the path switch is an n-channel metal-oxide-semiconductor field-effect transistor (NMOSFET), a source of the NMOSFET is connected to the power port, and a gate of the NMOSFET is connected to the pulse width modulator.

12. The electronic device according to claim 11, wherein the pulse width modulator comprises a feedback port and a control port, the feedback port is connected to the feedback module, and the control port is connected to the gate of the NMOSFET.

13. The electronic device according to claim 12, wherein the feedback module comprises a first resistor and a second resistor which are connected between the positive voltage input terminal of the power amplifier and ground; a first connection node of the first resistor and the second resistor is connected to the feedback port of the pulse width modulator.

14. The electronic device according to claim 13, wherein the feedback signal is a voltage of the first connection node which is proportional to the voltage of the positive voltage input terminal.

15. The electronic device according to claim 10, wherein the pulse width modulator is further configured to determine the voltage of the positive voltage input terminal according to the feedback signal, and compare the voltage of the positive voltage input terminal with a predetermined positive voltage; the pulse width modulator is further configured to enhance the duty cycle of the pulse signal output to the path switch when determining the voltage of the positive voltage input terminal is less than the predetermined positive voltage, and decrease the duty cycle of the pulse signal output to the path switch when determining the voltage of the positive voltage input terminal is greater than the predetermined positive voltage.

16. The electronic device according to claim 10, wherein the rectifier module comprises an inductor and a first capacitor which are connected between the path switch and ground, a second connection node of the inductor and the first capacitor is connected to the positive voltage input port of the power amplifier.

17. The electronic device according to claim 10, wherein the rectifier module negative voltage producing module comprises a second capacitor, a third capacitor, a first diode, and a second diode, the first diode, the second diode, and the third capacitor are connected in series and constitute a loop circuit; a cathode of the first diode is connected to an anode of the second diode, a first terminal of the third capacitor is connected to the anode of the first diode and constitutes an output port of the negative voltage producing module, a second terminal of the third capacitor is connected to the cathode of the second diode and is also connected to ground via a third resistor; the second capacitor is connected between the path and a third connection node of the cathode of the first diode and the anode of the second diode.

18. The electronic device according to claim 17, wherein the voltage regulating module comprises a zener diode, a cathode of the zener diode is grounded, and an anode of the zener diode is connected to the output port of the negative voltage producing module and the negative voltage input port of the power amplifier.

* * * * *